United States Patent [19]

Botterbrodt

[11] Patent Number: 5,914,583
[45] Date of Patent: Jun. 22, 1999

[54] MOTOR CONTROL FOR BOX PRINTING EQUIPMENT

[75] Inventor: Kenneth W. Botterbrodt, Marlton, N.J.

[73] Assignee: Intelligent Machine Control, Inc., West Berlin, N.J.

[21] Appl. No.: 09/005,622

[22] Filed: Jan. 9, 1998

[51] Int. Cl.[6] .................................. H02P 3/20; H02P 5/40
[52] U.S. Cl. ...................... 318/807; 318/370; 318/758; 318/809
[58] Field of Search ................................... 318/370–389, 318/366, 701, 708, 709, 758, 807, 809, 703; 156/542, 64, 277, 285, 364, 384, 249, 360, 363; 212/209, 205, 149; 364/424.04

[56] References Cited

U.S. PATENT DOCUMENTS

| | | | |
|---|---|---|---|
| 3,594,625 | 7/1971 | Richardson | 318/257 |
| 4,095,511 | 6/1978 | Woolston | 93/58.2 R |
| 4,411,194 | 10/1983 | Davidson, Jr. | 101/216 |
| 4,712,054 | 12/1987 | Boldt | 318/758 |
| 5,133,465 | 7/1992 | Kalan | 212/209 |
| 5,319,292 | 6/1994 | Backstrand | 318/371 |
| 5,342,461 | 8/1994 | Murphy | 156/64 |
| 5,350,076 | 9/1994 | Kalan | 212/209 |
| 5,828,195 | 10/1998 | Zalesski | 318/366 |
| 5,843,252 | 12/1998 | Murphy | 156/64 |

*Primary Examiner*—Paul Ip
*Attorney, Agent, or Firm*—Roberts & Mercanti, L.L.P.

[57] ABSTRACT

A motor control system for controlling the operating speed and direction of a three-phase induction motor. The invention particularly finds use for bringing a rotary printing cylinder precisely into register for processing products in sheet form, such as for printing sheets of corrugated cardboard in a machine for printing corrugated boxes. A three phase induction motor is single phase powered by an AC drive through a first and a second electrical conductor. Direction switching signals and time delay speed switching signals are applied to the appropriate terminals of the AC drive by the second and a third electrical conductor. This allows motor powering and control using only three conductors, such from as the slip rings on industry standard corrugated box printing equipment.

20 Claims, 2 Drawing Sheets

MOTOR CONTROL FOR BOX PRINTING EQUIPMENT

BACKGROUND OF THE INVENTION

1. Field of the Invention

The present invention relates to motor controls, or more particularly to a system for controlling the operating speed and direction of a three-phase induction motor. Still more particularly, the invention relates to a system for controlling the operating speed and direction of a three-phase induction motor used in corrugated box printing equipment. The invention particularly finds use for bringing rotary printing cylinders precisely into register for printing sheets of corrugated cardboard in a machine for printing such corrugated boxes.

2. Description of the Prior Art

During the processing of corrugated container blanks, corrugated cardboard sheets are passed through successive processing stations such as printing and die-cutting. A printing operation can require one, two, three or more printing stations and may employ one or more colored inks. Each printing station is normally comprised of rotary printing machines operating to impress an image on a cardboard box blank. A rotary printing machine typically comprises two opposed cylinders turning in opposite directions at the same circumferential speed. The series of printing stations are rotationally timed relative to each other so that each sheet passes through each station at a particular instant. As the various printing stations rotate and contact successive sheets, each station is intended to print at the correct position on the sheet. In this way, colors are superimposed on top of each other on the sheet to form the final product, e.g. a multicolored printed container blank. Should any printing operation not be performed at the correct position on the sheet, then the image is said to be out of register, thus producing an inferior processed sheet. The need to maintain accurate registration of paperboard sheets in the production of color printed container blanks has become more critical with higher production speeds and the demand for higher quality printing and multi-color graphics. The present invention is concerned with improving the accuracy of position registration when a multiplicity of sheets are moved successively through a plurality of printing stations.

The printing cylinders which are attached to rotary printing machines are rotated by means of three phase AC induction motors via an arrangement of gears designed to ensure that the circumferential speed of the print cylinders corresponds to the arrival of each sequential corrugated sheet to be printed. In these arrangements, a feed device introduces one sheet after another at constant intervals theoretically equal to that of the printing cylinder, i.e., one sheet for each revolution of the cylinder. Unfortunately, the accuracy of the arrival of the sheets to the printing cylinders is generally insufficient for the accuracy required for correctly positioning the printing on the sheets. This is due to slight irregularities in the sheet, displacement of the sheets of cardboard in the feed mechanism, and random slippage of the drive rollers of the printing machines. When the sheets are not presented strictly in register with the printing cylinders with the required precision, considerable waste results.

In the usual case, the printing cylinders are connected to a sheet feed device by means of a planetary gear train in which the satellite carrier is rotationally connected to a braking motor-reduction gear unit. The action of this motor-reduction gear unit should then enable the user to offset the print cylinders so as to bring them into register with the sheets to be printed. In this regard, it would be desirable to operate the braking motors at either a high speed during the printing operation or at a very slow speed, i.e. on the order of 1 Hz to effect print cylinder position adjustments. Unfortunately, the brakes on exiting braking motors tend to engage at such slow speeds making minute cylinder adjustments difficult or impossible. The present invention provides an improved motor control circuit which better controls the speed and direction of the motor turning the printing cylinders. The motor can operate in either the forward or reverse directions and at either high operational speed, or at a very slow position adjustment speed after brake release. The apparatus according to the invention makes it possible to reduce or avoid waste by presenting the print cylinders for the printing operation in precise synchronization and with images on the sheets in register. An important feature of the invention is to provide improved three phase induction motor and circuitry system which is retrofittable into existing printing machinery. Motor powering and control is accomplished using only three conductors. This is done by powering the motor with single phase current and simultaneously controlling the speed and direction of the motor via three slip ring contacts already present on such existing printing machinery.

SUMMARY OF THE INVENTION

The invention provides an apparatus for controlling the speed and direction of a three-phase induction motor comprising:

a) a three-phase AC induction motor, b) braking device on the motor which are in a brake-engaged condition when the motor is stopped;

c) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered- through a first and a second electrical conductor;

d) direction switching device for applying either a forward direction signal or a reverse direction signal to direction control terminals of the AC drive by the second and a third electrical conductor;

e) speed switching device for issuing either a first speed signal or a second speed signal to the speed control terminals of the AC drive by the second and a third electrical conductor, after the direction switching device issues either a forward direction signal or a reverse direction signal to the direction control terminals of the AC drive; and f) a device for releasing the braking means responsive to the forward direction signal or reverse direction signal.

The invention also comprises a circuit for controlling the speed and direction of a three-phase AC induction motor having braking device on the motor which are in a brake-engaged condition when the motor is stopped, which comprises:

a) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;

b) direction switching device for applying either a forward direction signal or a reverse direction signal to direction control terminals of the AC drive by the second and a third electrical conductor;

c) speed switching device for issuing either a first speed signal or a second speed signal to the speed control terminals of the AC drive by the second and a third electrical conductor, after the direction switching device issues either a forward direction signal or a reverse direction signal to the direction control terminals of the AC drive; and d) a device for releasing the braking device responsive to the forward direction signal or reverse direction signal.

The invention also provides a process for controlling the speed and direction of a three-phase AC induction motor having braking device on the motor which are in a brake-engaged condition when the motor is stopped, which comprises:

a) connecting an AC drive to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;

b) applying direction switching device to signal either a forward direction signal or a reverse direction signal to direction control terminals of the AC drive by the second and a third electrical conductor;

c) applying speed switching device to signal either a first speed signal or a second speed signal to the speed control terminals of the AC drive by the second and a third electrical conductor, after the direction switching device issues either a forward direction signal or a reverse direction signal to the direction control terminals of the AC drive; and d) applying braking releasing means responsive to the forward direction signal or reverse direction signal.

The invention further provides a speed and direction controlled printing machine comprising:

a) printer turning device for turning a rotary printer;

b) a three-phase AC induction motor rotatably attached to the printer turning device, c) braking device on the motor which are in a brake-engaged condition when the motor is stopped;

d) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;

e) direction switching device for applying either a forward direction signal or a reverse direction signal to direction control terminals of the AC drive by the second and a third electrical conductor;

f) speed switching device for issuing either a first speed signal or a second speed signal to the speed control terminals of the AC drive by the second and a third electrical conductor, after the direction switching means issues either a forward direction signal or a reverse direction signal to the direction control terminals of the AC drive; and g) a device for releasing the braking device responsive to the forward direction signal or reverse direction signal.

DETAILED DESCRIPTION OF THE PREFERRED EMBODIMENT

Figure 1:
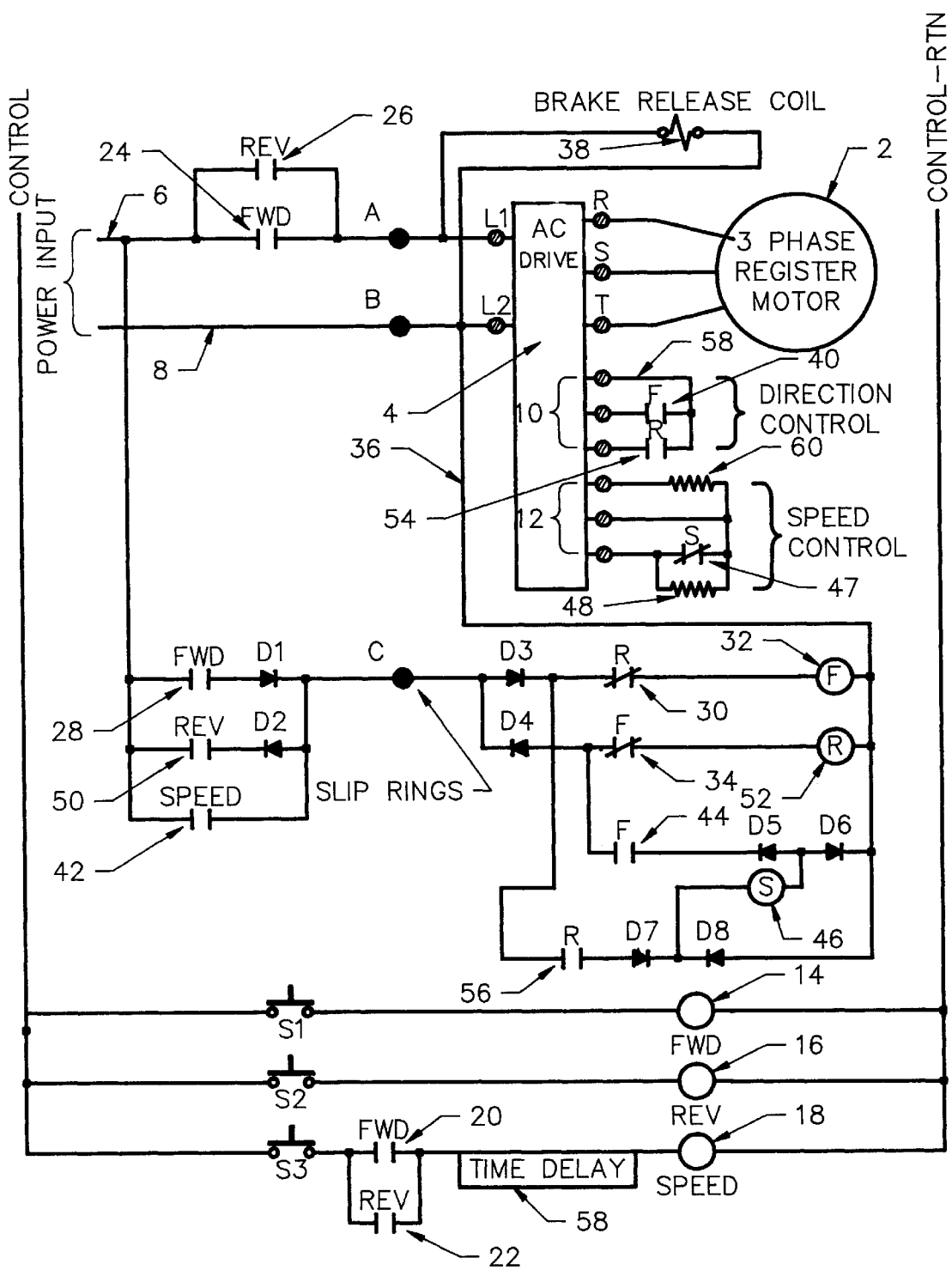
FIG. 1 is a schematic representation of a motor control circuit according to the invention.

FIG. 1 shows a motor and associated control circuit according to the invention. A three phase register motor 2 is connected via terminals R, S, and T to AC drive 4. The three phase motor may be of any desired power, however, a one-third to one-half horsepower, 230 volt motor is preferred. Suitable motor may be purchased commercially from any of a variety of sources such as Baldor Electric Company of Fort Smith Ark. Integrally attached to the motor is a brake which frictionally stops the motor when engaged. Such brakes are usually integrated into the brake assembly itself and is either engaged or released by a brake release coil. The AC drive is likewise well known in the art Suitable drives include a Boston Gear BCX drive available commercially from the Boston Gear Division of IMO Industries, Inc. of Quincy, Mass. AC drive 4 receives power from a single phase 230 volt, 2–3 amp, 60 Hz current source from power inputs 6 and 8. Such power is input via a pair of conductors which are preferably slip rings A and B which are part of existing printing machinery. Power enters the AC drive by means of leads L1 and L2. Direction and speed control commands are imparted to the AC drive at direction control terminals 10 and speed control terminals 12.

Motor direction is selected by either of switches S1 or S2. Switches S1 and S2 are shown to be manual push buttons, but it is understood that they could just as well be controls from a programmable logic controller, computer control or other automatic output device. The selection of S1 or S2 respectively energizes control forward relay coil 14 or reverse relay coil 16. After selection of a motor direction, a first speed or a second speed is selected by switch S3. A first speed is the default condition and a second speed is elected by closing S3 which activates coil 18. An important feature of the invention is that the direction must be selected prior to speed selection. Therefore, first the selection activation of relay 14 which closes normally open contact 20 or the activation of relay 16 which closes normally open contact 22 is required prior before S3 can be closed. The choice of appropriate switches S1, S2 and S3 and the activation of relays 14, 16 and 18 encodes the third conductor, or slip ring C with the chosen speed and direction.

To attain speed one in the forward direction, closing switch S1 activates relay 14 which closes contact 28. The activation of forward coil 14 also closes power contact 24 to the AC drive. Diode D1 allows only positive half wave rectified control current to appear on slip ring C. Current flows through diode D3, normally closed contact 30 and energies forward coil 32. Coil 32 opens contact 34 to prevent a reverse direction signal, causes current in line 36 to open brake release coil 38 and closes contact 40 to give the AC drive a forward direction signal through common return 58. The default speed in the forward direction is speed one. Speed one is determined by the value of resistor 60 which preferably has a value ranging from about 5,000 ohms to about 10,000 ohms.

If speed two is desired, S3 is chosen and current flows through now closed contact 20 to activate coil 18. Coil 18 closes normally open contacts 42. This allows a full 60 Hz sine wave control current to appear on slip ring C. This causes coil 32 to close contact 44 and control current flows through diode D3, closed contact 30, coil 32 diode D8, activates speed control coil 46, through diode D5, now closed contact 44 and diode D4. The return path for the direction and speed control signals is through slip ring B. The activation of speed control coil 46 opens contact 47 causing current to flow through resistor 48 and imparts a speed two signal command to the AC drive. Resistor 48 has a value which preferably ranges from about 5,000 ohms to about 10,000 ohms.

To attain speed one in the reverse direction, closing switch S2 activates relay 16 which closes contact 50. The activation of reverse coil 16 also closes power contact 26 to the AC drive. Diode D2 allows only negative half wave rectified control current to appear on slip ring C. Current flows through diode D4, normally closed contact 34 and energies reverse coil 52. Coil 52 opens normally closed contact 30 to prevent a forward direction signal, causes current in line 36 to open brake release coil 38 and closes contact 54 to give the AC drive a reverse direction signal through common return 58. The default speed in the reverse direction is speed one. If speed two is desired, S3 is chosen and current flows through now closed contact 22 to activate coil 18. Coil 18 closes normally open contacts 42. This allows a full 60 Hz sine wave control current to appear on slip ring C. This causes coil 52 to close contact 56 and control current flows through diode D3, closed contact 56, diode D7, activates speed control coil 46, through diode D6, coil 52, closed contact 34 and diode D3. The return path for the direction and speed control signals is through slip ring B. The activation of speed control coil 46 opens contact S4 causing current to flow through resistor 48 and imparts a speed two signal command to the AC drive.

In one embodiment of the invention, a time delay circuit 58 is positioned between switch S3 and speed control coil 18. A time delay of from about 5 to about 50 milliseconds is preferred and a time delay of from about 5 to about 10 milliseconds is more preferred. In the preferred embodiment, speed one for the motor operates at about 60 Hz. In the preferred embodiment, to achieve speed two the motor operates in a range of from about 10 Hz or less, preferably from about 0.1 Hz to about 1 Hz and most preferably from about 0.1 Hz to about 0.5 Hz. Each of diodes D1–D8 and coils 14, 16, 18, 32, 46 and 52 are selected according to the current carried by the circuit and can easily be determined by those skilled in the art.

Figure 2:
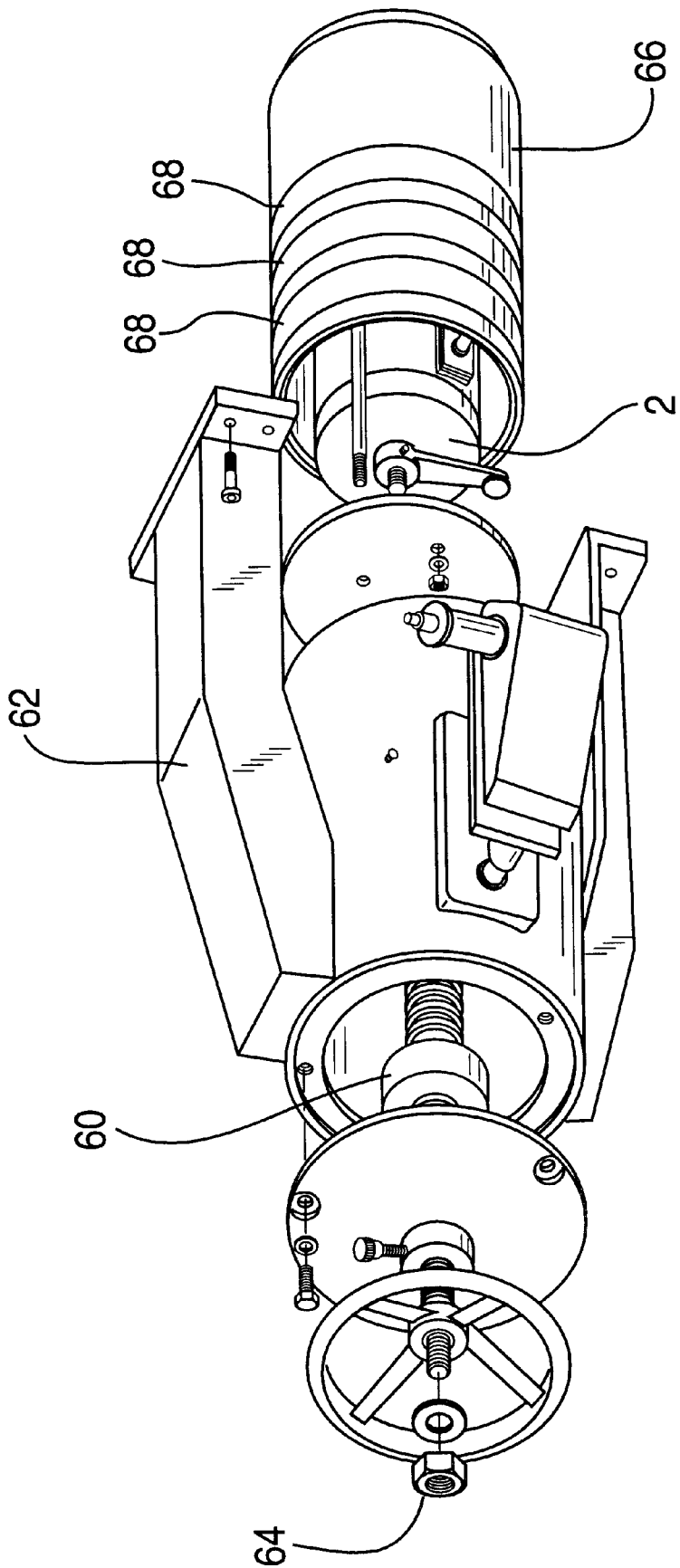
FIG. 2 is a schematic representation of a motor control system in a box printing apparatus.

FIG. 2 shows the relevant portion of a typical prior art rotary printing machine for printing corrugated boxes. Such may be, for example, an Isowa PS-6T flexographic printer slotter. The control circuit of this invention is mounted onto the motor in this machine and is useful for bringing rotary printing cylinders attached to the machine into register for printing corrugated sheets. As such, a speed and direction controlled printing machine has printer turning means for turning a rotary printer. Such may include a shaft 60 which is mounted in a suitable fixed housing 62. One end 64 of the shaft is connected to a rotary printing cylinder (not shown). Another end of the shaft is attached to a three phase AC induction motor 2 including braking device is mounted for rotation within stationary cylinder 66. The motor is powered by means of slip ring conductors 68. The AC drive 4 and a printed circuit board bearing the circuitry shown in FIG. 1 is mounted on the motor 2 within cylinder 66 and is electrically connected between motor 2 and slips rings 68.

What is claimed is:

1. An apparatus for controlling the speed and direction of a three-phase induction motor comprising:
    a) a three-phase AC induction motor,
    b) braking means on the motor which are in a brake-engaged condition when the motor is stopped;
    c) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;
    d) direction switching means for applying either a forward direction signal or a reverse direction signal to direction control terminals of the AC drive by the second and a third electrical conductor;
    e) speed switching means for issuing either a first speed signal or a second speed signal to the speed control terminals of the AC drive by the second and a third electrical conductor, after the direction switching means issues either a forward direction signal or a reverse direction signal to the direction control terminals of the AC drive; and
    f) means for releasing the braking means responsive to the forward direction signal or reverse direction signal.

2. The apparatus of claim 1 wherein the electrical conductors are slip rings.

3. The apparatus of claim 1 wherein the AC drive is capable of causing the motor to operate at about 60 Hz.

4. The apparatus of claim 1 wherein the AC drive is capable of causing the motor to operate at from about 10 Hz or less.

5. The apparatus of claim 1 wherein the speed switching means further comprises time delay means.

6. The apparatus of claim 5 wherein the time delay means causes a speed switching delay of from about 5 to about 50 milliseconds.

7. A circuit for controlling the speed and direction of a three-phase AC induction motor having braking means on the motor which are in a brake-engaged condition when the motor is stopped, which comprises:
    a) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;
    b) direction switching means for applying either a forward direction signal or a reverse direction signal to direction control terminals of the AC drive by the second and a third electrical conductor;

c) speed switching means for issuing either a first speed signal or a second speed signal to the speed control terminals of the AC drive by the second and a third electrical conductor, after the direction switching means issues either a forward direction signal or a reverse direction signal to the direction control terminals of the AC drive; and d) means for releasing the braking means responsive to the forward direction signal or reverse direction signal.

8. The circuit of claim 7 wherein the electrical conductors are slip rings.

9. The circuit of claim 7 wherein the AC drive is capable of causing the motor to operate at about 60 Hz.

10. The circuit of claim 7 wherein the AC drive is capable of causing the motor to operate at about 10 Hz or less.

11. The circuit of claim 7 wherein the speed switching means further comprises time delay means.

12. The circuit of claim 11 wherein the time delay means causes a speed switching delay of from about 5 to about 50 milliseconds.

13. A process for controlling the speed and direction of a three-phase AC induction motor having braking means on the motor which are in a brake-engaged condition when the motor is stopped, which comprises:

a) connecting an AC drive to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;

b) applying direction switching means to signal either a forward direction signal or a reverse direction signal to direction control terminals of the AC drive by the second and a third electrical conductor;

c) applying speed switching means to signal either a first speed signal or a second speed signal to the speed control terminals of the AC drive by the second and a third electrical conductor, after the direction switching means issues either a forward direction signal or a reverse direction signal to the direction control terminals of the AC drive; and d) applying braking releasing means responsive to the forward direction signal or reverse direction signal.

14. The process of claim 13 wherein the electrical conductors are slip rings.

15. A speed and direction controlled printing machine comprising:

a) printer turning means for turning a rotary printer;

b) a three-phase AC induction motor rotatably attached to the printer turning means, c) braking means on the motor which are in a brake-engaged condition when the motor is stopped;

d) an AC drive connected to the motor for driving the motor in either a forward direction or a reverse direction responsive to either a forward direction signal or a reverse direction signal applied to direction control terminals of the AC drive; and for driving the motor at either a first speed or a second speed responsive to either a first speed signal or a second speed signal applied to speed control terminals of the AC drive; which AC drive is single phase powered through a first and a second electrical conductor;

e) direction switching means for applying either a forward direction signal or a reverse direction signal to direction control terminals of the AC drive by the second and a third electrical conductor;

f) speed switching means for issuing either a first speed signal or a second speed signal to the speed control terminals of the AC drive by the second and a third electrical conductor, after the direction switching means issues either a forward direction signal or a reverse direction signal to the direction control terminals of the AC drive; and g) means for releasing the braking means responsive to the forward direction signal or reverse direction signal.

16. The printing machine of claim 15 wherein the printer turning means includes a stationary cylindrical housing surrounding the motor such that the motor is rotatably mounted within the cylindrical housing; and the first, second and third conductors are slip rings around the circumference of the housing.

17. The printing machine of claim 15 wherein the AC drive is capable of causing the motor to operate at about 60 Hz.

18. The printing machine of claim 15 wherein the AC drive is capable of causing the motor to operate at from about 10 Hz or less.

19. The printing machine of claim 15 wherein the speed switching means further comprises time delay means.

20. The printing machine of claim 19 wherein the time delay means causes a speed switching delay of from about 5 to about 50 milliseconds.

* * * * *